(12) United States Patent
Onishi

(10) Patent No.: US 7,269,691 B2
(45) Date of Patent: Sep. 11, 2007

(54) ELECTRONIC DEVICE FOR MANAGING REMOVABLE STORAGE MEDIUM, METHOD AND STORAGE MEDIUM THEREFOR

(75) Inventor: Shinji Onishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 662 days.

(21) Appl. No.: 09/725,033

(22) Filed: Nov. 29, 2000

(65) Prior Publication Data
US 2001/0002846 A1   Jun. 7, 2001

(30) Foreign Application Priority Data
Dec. 3, 1999 (JP) .................................. 11-345496
Nov. 20, 2000 (JP) .............................. 2000-352883

(51) Int. Cl.
*G06F 12/12* (2006.01)
(52) U.S. Cl. ................... 711/115; 711/100; 711/101; 711/154; 710/100; 710/300; 710/301
(58) Field of Classification Search ............... 711/115; 710/301
See application file for complete search history.

(56) References Cited

U.S. PATENT DOCUMENTS

| | | | | |
|---|---|---|---|---|
| 5,590,376 A | * | 12/1996 | Kou ............................. | 710/19 |
| 5,940,854 A | * | 8/1999 | Green et al. ................. | 711/112 |
| 6,314,502 B1 | * | 11/2001 | Piersol ....................... | 711/162 |
| 6,370,545 B1 | * | 4/2002 | Shaath ....................... | 707/200 |
| 6,446,140 B1 | * | 9/2002 | Nozu ........................... | 710/1 |
| 6,604,153 B2 | * | 8/2003 | Imamura et al. ............. | 710/36 |
| 6,618,796 B2 | * | 9/2003 | Yamakawa et al. ......... | 711/164 |

FOREIGN PATENT DOCUMENTS

| | | | |
|---|---|---|---|
| EP | 0951018 A1 | | 10/1999 |
| EP | 951018 A1 | * | 10/1999 |
| EP | 1130597 A1 | * | 9/2001 |
| JP | 03242891 A | * | 10/1991 |
| JP | 04236623 A | * | 8/1992 |
| JP | 08221877 A | * | 8/1996 |
| KR | 2001-0075393 | | 8/2001 |
| WO | 01/08158 | | 2/2001 |

* cited by examiner

*Primary Examiner*—Gary Portka
*Assistant Examiner*—Kaushik Patel
(74) *Attorney, Agent, or Firm*—Fitzpatrick, Cella, Harper & Scinto

(57) ABSTRACT

A device for managing removable storage media includes a first management unit and a control unit. The first management unit is adapted to update first media management information which is held in said device and which includes at least a first datum that is used to detect that one removable storage medium has been replaced with a second removable storage medium, when the second removable storage medium is connected to said device, the first datum being information other than a user-input password. The control unit is adapted to test a command from an external device for consistency with the first datum and to execute the command if the first datum is consistent with second media management information contained in the command.

16 Claims, 9 Drawing Sheets

FIG. 3

|  | MEDIA REMOVE | MEDIA INSERT | FILE DELETE/WRITE |
|---|---|---|---|
| MEDIA GENERATION COUNTER | UNCHANGED | UPDATED | UNCHANGED |
| CONTENTS GENERATION COUNTER | UPDATED | UPDATED | UPDATED |

FIG. 4

|  | COMMAND FORMAT | RESPONSE FORMAT |
|---|---|---|
|  | msb ... lsb | msb ... lsb |
| OPCODE | QUERY_FILE_LIST | ⇐ |
| OPERAND [0] | FF₁₆ | result |
| OPERAND [1] | physical_volume_number | ⇐ |
| OPERAND [2] | logical_volume_number | ⇐ |
| OPERAND [3] / OPERAND [4] | FFFF₁₆ | current_media_generation_count |
| OPERAND [8] / OPERAND [9] | FFFF₁₆ | current_contents_generation_count |
| OPERAND [10] / OPERAND [11] / OPERAND [12] | extension_type | ⇐ |
| OPERAND [13] | depth | ⇐ |
| OPERAND [14] ... | start_path |  |

FIG. 5

| ADDRESS OFFSET | CONTENTS | |
|---|---|---|
| $00_{16}$ | FILE NAME (BASE) | 501 |
| ⋮ | | |
| $07_{16}$ | | |
| $08_{16}$ | FILE NAME (EXTENSION) | 502 |
| $09_{16}$ | | |
| $0A_{16}$ | | |
| $0B_{16}$ | ATTRIBUTE BYTE | 503 |
| $0C_{16}$ | RESERVED | 504 |
| ⋮ | | |
| $15_{16}$ | | |
| $16_{16}$ | MODIFICATION TIME | 505 |
| $17_{16}$ | | |
| $18_{16}$ | MODIFICATION DATE | 506 |
| $19_{16}$ | | |
| $1A_{16}$ | STARTING ALLOCATION UNIT | 507 |
| $1B_{16}$ | | |
| $1C_{16}$ | FILE SIZE | 508 |
| $1D_{16}$ | | |
| $1E_{16}$ | | |
| $1F_{16}$ | | |

| BIT OFFSET | CONTENTS |
|---|---|
| 0 (lsb) | READ ONLY |
| 1 | HIDDEN |
| 2 | SYSTEM |
| 3 | VOLUME |
| 4 | DIRECTORY |
| 5 | ARCHIVE |
| 6 | RESERVED |
| 7 (msb) | |

| FIELD NAME | VALUE | |
|---|---|---|
| EXTENSION TYPE | 4A 50 47$_{16}$ ( "JPG" ) | 801 |
| DEPTH | 01$_{16}$ | 802 |
| START PATH | 5C 44 43 49 4D$_{16}$ ( "¥DCIM" ) | 803 |

FIG. 9

| FILE NAME (BASE) | FILE NAME (EXTENSION) | ATTRIBUTE BYTE | |
|---|---|---|---|
| "DCIM" | "" | DIRECTORY | ~ 901 |
| "100ABCDE" | "" | DIRECTORY | ~ 902 |
| "ABCD0001" | "JPG" | FILE | ~ 903 |
| "ABCD0002" | "JPG" | FILE | ~ 904 |
| "WXYZ0003" | "JPG" | FILE | ~ 905 |
| ".." | "" | DIRECTORY | ~ 906 |
| "101ABCDE" | "" | DIRECTORY | ~ 907 |
| ".." | "" | DIRECTORY | ~ 908 |
| "102ABCDE" | "" | DIRECTORY | ~ 909 |
| "ABCD0004" | "JPG" | FILE | ~ 910 |
| "ABCD0005" | "JPG" | FILE | ~ 911 |
| ".." | "" | DIRECTORY | ~ 912 |
| ".." | "" | DIRECTORY | ~ 913 |

| | COMMAND FORMAT 1001 | RESPONSE FORMAT 1002 |
|---|---|---|
| | msb          lsb | msb          lsb |
| OPCODE | ERASE | ⇐ |
| OPERAND [0] | $FF_{16}$ | result |
| OPERAND [1] | reserved | ⇐ |
| OPERAND [2] | reserved | ⇐ |
| OPERAND [3] | physical_volume_number | ⇐ |
| OPERAND [4] | logical_volume_number | ⇐ |
| OPERAND [5] | media_generation_count | current_media_generation_count |
| OPERAND [6] | | |
| OPERAND [7] | contents_generation_count | current_contents_generation_count |
| OPERAND [8] | | |
| OPERAND [9] ⋮ | file_ID | ⇐ |

FIG. 11

| | COMMAND FORMAT | RESPONSE FORMAT |
|---|---|---|
| | msb · · · · · lsb | msb · · · · · lsb |
| OPCODE | WRITE | ⇐ |
| OPERAND [0] | FF₁₆ | result |
| OPERAND [1] | reserved | ⇐ |
| OPERAND [2] | reserved | ⇐ |
| OPERAND [3] | destination_plug | ⇐ |
| OPERAND [4] | | |
| OPERAND [5] | file_size | ⇐ |
| OPERAND [6] | | |
| OPERAND [7] | | |
| OPERAND [8] | | |
| OPERAND [9] | media_generation_count | current_media_generation_count |
| OPERAND [10] | | |
| OPERAND [11] | contents_generation_count | current_contents_generation_count |
| OPERAND [12] | | |
| OPERAND [13] | physical_volume_number | ⇐ |
| OPERAND [14] | logical_volume_number | ⇐ |
| OPERAND [15] ⋮ | file_ID | new_file_ID |

1101 — COMMAND FORMAT
1102 — RESPONSE FORMAT

ELECTRONIC DEVICE FOR MANAGING REMOVABLE STORAGE MEDIUM, METHOD AND STORAGE MEDIUM THEREFOR

BACKGROUND OF THE INVENTION

1. Field of the Invention

The present invention relates to an electronic device, connected to another electric device, for managing a removable storage medium, and a method and a storage medium therefor.

2. Related Background Art

The networking of imaging devices such as a digital camera or digital camcorder has recently progressed and there is being developed an environment capable of connecting such devices with a personal computer or peripheral devices thereof at home.

Many such imaging devices are provided with a removable storage medium (also called simply a "removable medium"), and store various digital information (still image data, moving image data, audio data, text data, etc.) in such removable medium by converting such information into a file of predetermined format.

For making access from an imaging device (first imaging device) connected to a network to a removable storage medium connected to another imaging device (second imaging device), there can be conceived the following two methods. The first method consists of the user manually moving the desired storage medium from the second imaging device to the first imaging device and making direct access by the first imaging device to the storage medium. The second method consists of making access by the first imaging device to the desired storage medium without moving the removable storage medium from the second imaging device to the first imaging device (namely while the storage medium is connected to the second imaging device).

In order to exploit the first method, however, each imaging device has to be provided with a structure capable of directly connecting with the storage medium desired by the user. Particularly in a case where storage media of plural kinds are desired by the user, each imaging device has to be capable of accommodating all such storage media. Such requirement, however, results in the drawback of hindering the compactization, simplification and cost reduction of the imaging device. There is also encountered the drawback that a new kind of storage medium cannot be accommodated.

On the other hand, in order to exploit the second method, the first imaging device has to be provided with a procedure for judging or recognizing a replacement of the storage medium connected to the second imaging device or a change in the content of such storage medium. Without such procedure, there cannot be avoided erroneous operations such as deletion of a file not intended by the user, addition of a file to a storage medium not intended by the user, or deletion of a file from a storage medium not intended by the user.

SUMMARY OF THE INVENTION

An object of the present invention is to solve the above-described drawbacks.

Another object of the present invention is to provide a device capable of managing a removable storage medium connected to another device in a simple manner and without error, and a method and a storage medium therefor.

The above-described objects can be attained, according to a preferred embodiment of the present invention, by an electronic device capable of managing a removable storage medium, comprising a first management unit adapted to update first media management information which is held in the device and is used to detect that one removable storage medium has been replaced with a second removable storage medium, when the second removable storage medium is connected to the device. The first media management information includes a first datum that is used to detect the replacement of the first with the second storage medium. Also provided in the device is a control unit adapted to test a command from an external device for consistency with the first datum and to execute the command if the first datum is consistent with second media management information contained in the command.

According to the present invention, there is also provided a method for managing a removable storage medium, for an electronic device, the method comprising a first management step of updating first media management information which is held in said device and which includes at least a first datum that is used to detect that one removable storage medium has been replaced with a second removable storage medium, when the second removable storage medium is connected to the device, and an executing step of testing a command from an external device for consistency with the first datum and executing the command if the first datum is consistent with second media management information contained in the command.

According to the present invention, there is also provided a computer readable memory medium storing a program for executing a method of managing a removable storage medium for an electronic device, the method comprising a first management step of updating first media management information which is held in said device and which includes at least a first datum that is used to detect that one removable storage medium has been replaced with a second removable storage medium, when the second removable storage medium is connected to the device, and an executing step of testing a command from an external device for consistency with the first datum and executing the command if the first datum is consistent with second media management information contained in the command.

Still other objects of the present invention, and the advantages thereof, will become fully apparent from the following detailed description of the embodiments.

BRIEF DESCRIPTION OF THE DRAWINGS

FIG. 3 is a view showing an example of update condition and update content of two counters provided in the controlled device;

FIG. 4 is a view showing the data format of QUERY FILE LIST command and QUERY FILE LIST response in an embodiment of the present invention;

FIG. 5 is a view showing the data format of directory entry information;

FIG. 9 is a view showing an example of the file system transferred from the controlled device;

FIG. 10 is a view showing the data format of ERASE command and ERASE response in an embodiment of the present invention;

FIG. 11 is a view showing the data format of WRITE command and WRITE response in an embodiment of the present invention.

DESCRIPTION OF THE PREFERRED EMBODIMENTS

The preferred embodiments of the present invention will now be described in detail hereinafter with reference to the accompanying drawings.

Figure 1:
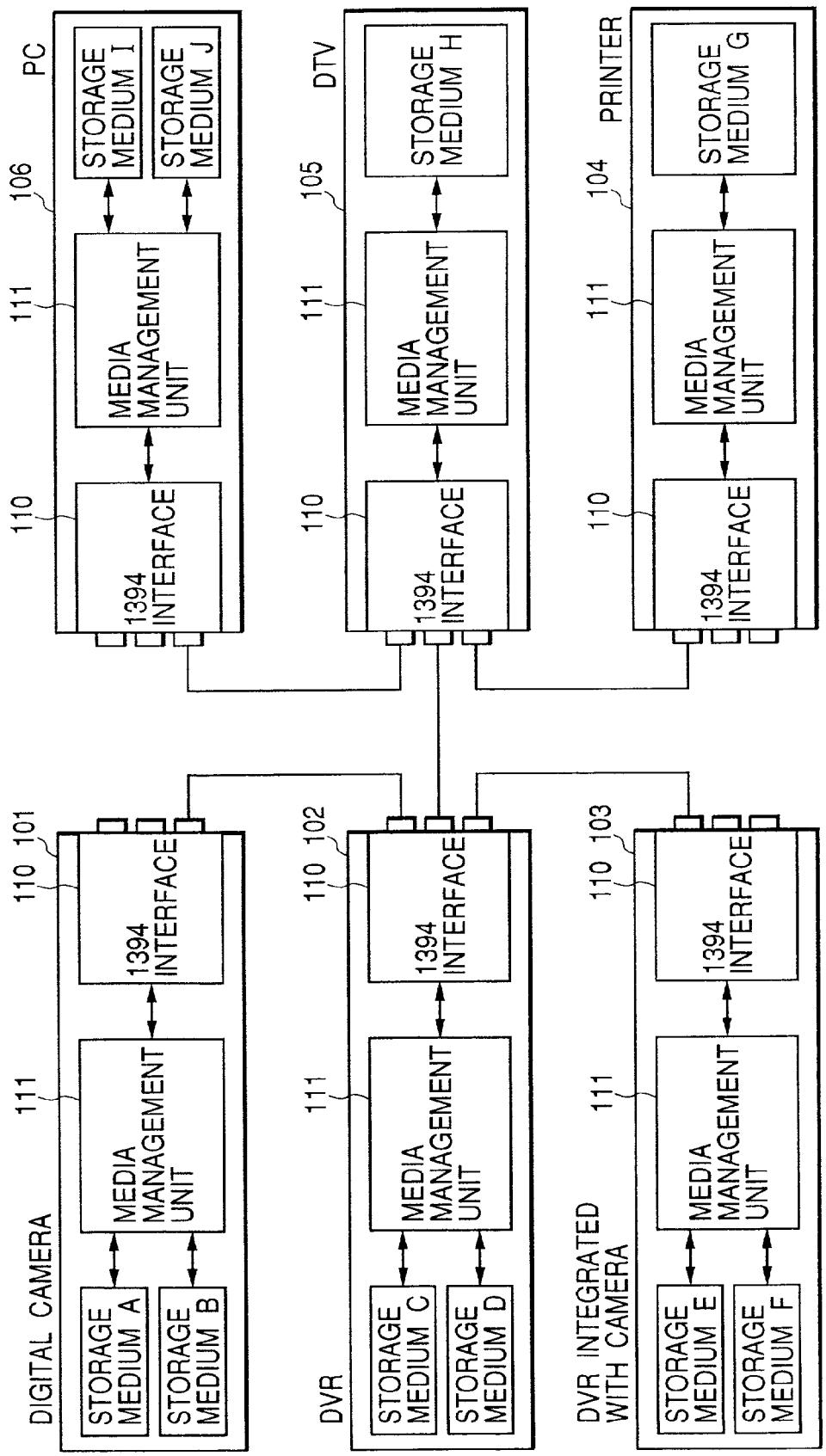
FIG. 1 is a view showing a storage medium management system embodying the present invention.

FIG. 1 is a view showing an example of the storage medium management system of an embodiment of the present invention.

Referring to FIG. 1, a digital camera 101 is capable of detachably mounting removable storage media A and B. A digital video recorder (DVR) 102 is capable of mounting removable storage media C and D. A camera-integrated digital video recorder (camera-integrated DVR) 103 is capable of mounting removable storage media E and F. A printer 104 is capable of mounting a removable storage medium G. A digital television receiver (DTV) 105 is capable of mounting a removable storage medium H. A personal computer (PC) 106 is capable of mounting removable storage media I and J.

Among these storage media, several, A, B, C, E, G and I, can be composed of floppy disks or semiconductor memories of various standards, such as the PC card standard, compact flush standard, smart media standard, multi-media card standard, etc. Also, storage media E, F, H and J are composed of large-capacity disk media capable of writing and reading. Such large-capacity disk medium can be, for example, an optical disk such as CD-ROM or DVD disk, a magnetic disk or a magnetooptical disk.

The electronic devices 101 to 106 are mutually connected through a digital interface 110 based on the IEEE 1394 standard and its expansions, for example IEEEP1394.a constituting a revision of the IEEE 1394 standard (hereinafter called a "1394 interface"). The 1394 interface 110 enables connection with high freedom and has two different data transfer modes (isochronous and asynchronous).

Each of the electronic devices 101 to 106 is provided with a media management unit 111 for managing one or more of the removable storage media A to J that are connected to the device in question, and other devices. The media management units 111 mutually communicate various commands and responses thereto through the 1394 interfaces 111, thereby communicating the information on the storage medium managed by the given unit to other media management units 111 and remote-controlling the storage media managed by other media management units 111. More specifically, the media management unit 111 performs the processes of (1) communicating the status of the storage medium of the given device to other devices, (2) inquiring the status of the storage medium of another device, and (3) updating the content of the storage medium of another device.

In the present embodiment, a device making access to one of the removable storage media connected to other devices and remote controlling such removable storage medium is referred to as the "controlling device". Also, a device whose storage medium is to be controlled by the controlling device is referred to as the "controlled device". Each of the electronic devices 101 to 106 shown in FIG. 1 can become the controlled device or the controlling device.

Figure 2:
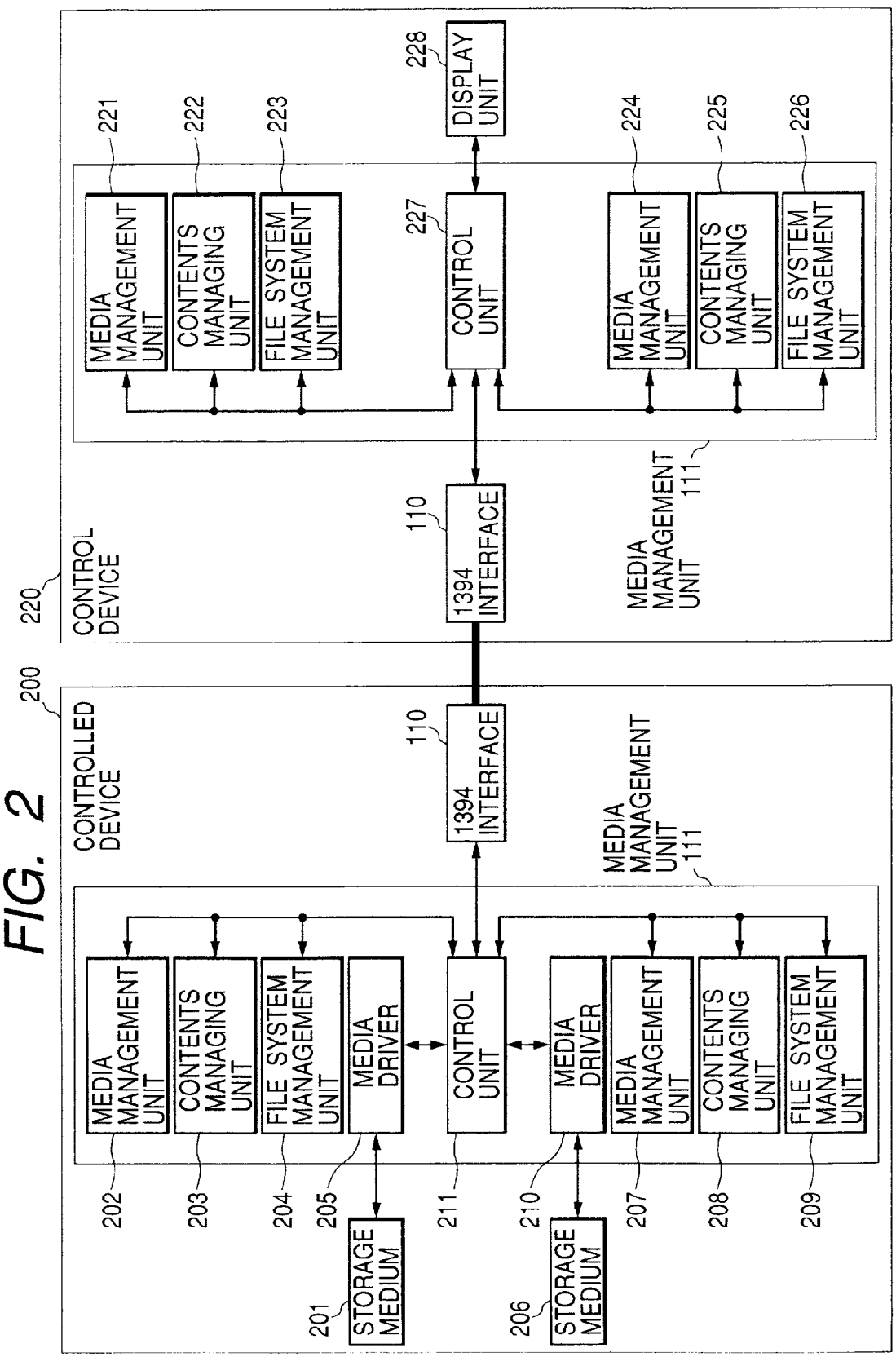
FIG. 2 is a block diagram showing the configuration realizing the function of a controlled device and a controlling device embodying the present invention.

Now there will be explained, with reference to FIG. 2, the configuration of the media management unit 111 provided in the controlling device and that of the media management unit 111 provided in the controlled device of the present embodiment. The file management unit 111 in each of electronic devices 101 to 106 shown in FIG. 1 is provided with the functions of both the controlled device and the controlling device.

At first there will be explained the configuration of the media management unit 111 in the controlled device.

A first removable storage medium 201 corresponds to storage medium A, C, E, G, H or I in FIG. 1. A media management unit 202 is provided with a media generation count register corresponding to the storage medium 201, and manages, utilizing the media generation count register, a media generation count which is the media management information for the storage medium 201. A contents management unit 203 is provided with a contents generation count register corresponding to the storage medium 201, and manages, utilizing the contents generation count register, a contents generation count which is the contents management information of the storage medium 201.

A file system management unit 204 reads, holds and manages directory structure, directory entry information of each directory and directory entry information of each file of the storage medium 201 at the connection thereof. A media driver 205 corresponding to the storage medium 201 serves to detect the connection thereof, to read the data stored therein and to write data therein.

A second removable storage medium 206 corresponds to storage medium B, D, F or J in FIG. 1. A media management unit 207 is provided with a media generation count register corresponding to the storage medium 206, and manages, utilizing the media generation count register, a media generation count which is the media management information for the storage medium 206. A contents management unit 208 is provided with a contents generation count register corresponding to the storage medium 206, and manages, utilizing the contents generation count register, a contents generation count which is the contents management information of the storage medium 201.

A file system management unit 209 reads, holds and manages directory structure, directory entry information of each directory and directory entry information of each file of the storage medium 206 at the connection thereof. A media driver 210 corresponding to the storage medium 206 serves to detect the connection thereof, to read the data stored therein and to write data therein. A control unit 211 controls the function of the entire media management unit 111 according to commands and corresponding responses to be explained later.

In the following there will be explained the configuration of the media management unit 111 provided in the controlling device.

A media management unit 221 is provided with a media generation count register corresponding to the storage medium 201, and holds and manages the media generation count of the storage medium 201 in the media generation count register. A contents management unit 222 is provided with a contents generation count register corresponding to the storage medium 201, and holds and manages the contents generation count of the storage medium 201 in the contents generation count register. A file system management unit 223 holds and manages directory entry information of the storage medium 201, obtained as a result of query to the controlled device.

A media management unit 224 is provided with a media generation count register corresponding to the storage medium 206, and holds and manages the media generation count of the storage medium 206 in the media generation count register. A contents management unit 225 is provided with a contents generation count register corresponding to the storage medium 206, and holds and manages the contents generation count of the storage medium 206 in the contents generation count register. A file system management unit 226 holds and manages directory entry information of the storage medium 206, obtained as a result of query to the controlled device.

A control unit 227 controls the function of the entire media management unit 111 according to commands and corresponding responses to be explained later. A display unit 228 informs the user of the result of processing of the media management unit 111.

Now reference is made to FIG. 3 for explaining an update condition for the media generation count managed by the media management units 202, 207 and an update condition for the contents management count managed by the contents management units 203, 208.

Referring to FIG. 3, "media remove" 303 indicates detachment of the storage medium 201 (or 206) from the controlled device. Also, "media insert" 304 indicates connection of the storage medium 201 (or 206) to the controlled device or replacement of the storage medium 201 (or 206) with another medium. Also, "file deletion/writing" 305 indicates deletion of a file recorded on the storage medium 201 (or 206) or addition or overwriting of a new file on the storage medium 201 (or 206).

As shown in FIG. 3, the media generation count is updated when the storage media 201 (or 206) is connected to the controlled device or is replaced by another storage medium. On the other hand, the contents generation count is generated when the storage medium 201 (or 206) is connected to the controlled device, is replaced by another storage medium, is detached from the controlled device, is subjected to deletion of a file recorded in the storage medium, or is subjected to addition or overwriting of a new file therein.

Consequently, in case the storage medium 201 (or 206) is detached from the controlled device, the media management unit 202 (or 207) does not update the media generation count, but the contents management unit 203 (or 208) updates the contents generation count.

Also in case the storage medium 201 (or 206) is connected to the controlled device or is replaced by another storage medium, the media management unit 202 (or 207) updates the media generation count and the contents management unit 203 (or 208) updates the contents generation count.

Also in case a file recorded in the storage medium 201 (or 206) is deleted or a new file is added or overwritten in the storage medium 201 (or 206), the media management unit 202 (or 207) does not update the media generation count but the contents management unit 203 (or 208) updates the contents generation count.

The control unit 227 of the controlling device can recognize, based on the media generation count managed by the media management unit 202 (or 207), whether the storage medium 201 (or 206) is connected to the controlled device and whether it is replaced by another storage medium. The control unit 227 of the controlling device can also recognize, based on the contents generation count managed by the contents management unit 203 (or 208), whether the recorded content of the storage medium 201 (or 206) has been changed.

The media generation count and the contents generation count are initialized for example to "0" when the power supply of the controlled device is turned on, and are upcounted (incremented) by one at each update. The contents generation count is initialized to "0" when the storage medium 201 (or 206) is detached from the controlled device. The media generation count and the contents generation count are not initialized to "0" when a bus resetting is activated but retain their prior settings prior to the bus resetting. The bus resetting is an essential function of the 1394 interface, and is activated when a connected device is detached, when a new device is connected or when the main power supply of a connected device is turned on or off. In the bus resetting, there are executed a bus initializing process (process for initializing the topology information), a tree recognition process (process for automatically recognizing the topology) and a self-recognition process (process for automatically setting a node ID for identifying each device).

In the following there will be explained, with reference to FIGS. 4, 10 and 11, commands transmitted from the controlling device to the controlled device and responses to such commands. In the present embodiment, the commands and responses are transmitted and received utilizing the function control protocol based on the IEC61883 standard.

At first there will be explained a QUERY FILE LIST command and a QUERY FILE LIST response with reference to FIG. 4.

In FIG. 4, "command format" 401 indicates the data format of a "QUERY FILE LIST command" which is one of the commands transmitted from the controlling device to the controlled device, and "response format" 402 indicates the data format of a "QUERY FILE LIST response" which is the response to the aforementioned QUERY FILE LIST command. The QUERY FILE LIST command is used for request a file list of the removable storage medium connected to the controlled device. The file list is a list consisting of directory entry information of directories and files present between predetermined directories.

In the QUERY FILE LIST command 401, an opcode field contains an opcode indicating a QUERY FILE LIST command, and, in the operand field, various parameter information required for the QUERY FILE LIST command.

Also in the QUERY FILE LIST command 401, a physical volume number field (operand [1]) contains a physical volume number, which is information for designating a storage medium among physically different two or more storage media. In a case where the controlled device is connectable to physically different two or more storage media, the controlling device designates a specified storage medium, utilizing the physical volume number.

Also in the QUERY FILE LIST command 401, a logical volume number field (operand [2]) contains a logical volume number, which is information for designating a storage area among logically different two or more storage areas. In a case where the storage medium designated by the physical volume number is logically divided, the controlling device designates a specified storage area, utilizing the logical volume number.

Also in the QUERY FILE LIST command 401, an extension type field (operands [10] to [12]) contains an extension type, which is information for designating an extender of a file (for example information indicating "JPG" in case of requesting a file list of JPEG files). The controlling device can acquire a file list of the files having a specified extender, by setting an extension type indicating a predetermined extender in the extension type field.

Also in the QUERY FILE LIST command 401, a depth field (operand [13]) contains a depth, which is information for designating a level of the file list to be requested. The controlling device can acquire a field between arbitrary directories by setting a predetermined value in the depth field.

Also in the QUERY FILE LIST command 401, a start path field (operands [14] and thereafter) contains a start path, which is information for designating the directory of which file list is to be acquired.

In the QUERY FILE LIST response 402, an opcode field contains a value same as that of the opcode field of the QUERY FILE LIST command 401. An operand field contains various parameter information corresponding to the QUERY FILE LIST command 401. In the QUERY FILE LIST response 402, a symbol ".rarw." indicates that there is stored a value that is the same as that of the QUERY FILE LIST command.

Also in the QUERY FILE LIST response 402, an operand [0] field contains a result code, indicating the result of execution for the received QUERY FILE LIST command 401.

Also in the QUERY FILE LIST response 402, a current media generation count field (operand [1] to operand [2]) contains the latest media generation count managed by the media management unit 202 (or 207) of the controlled device.

Also in the QUERY FILE LIST response 402, a current contents generation count field (operand [3] to operand [4]) contains the latest contents generation count managed by the contents management unit 203 (or 208) of the controlled device.

In the following there will be explained an ERASE command and an ERASE response with reference to FIG. 10.

Referring to FIG. 10, a "command format" 1001 indicates the data format of an "ERASE command" which is one of the commands transmitted from the controlling device to the controlled device, and a "response format" 1002 indicates the data format of an "ERASE response" corresponding to the aforementioned ERASE command. The ERASE command is used for erasing a file recorded in one of the removable storage media connected to the controlled device.

In the ERASE command 1001, an opcode field contains an opcode indicating an ERASE command. Also an operand field contains various parameter information required for the ERASE command.

Also in the ERASE command 1001, a physical volume number field (operand [3]) contains the aforementioned physical volume number. Also, a logical volume number field (operand [4]) contains the aforementioned logical volume number. The controlling device designates, as the object of access, a specified storage medium among the physically or logically different plural storage media, based on these two fields.

Also in the ERASE command 1001, a media generation count field (operand [5] to operand [6]) contains the media generation count managed by the media management unit 221 (or 224). This media generation count is obtained in the current media generation count field of the aforementioned QUERY FILE LIST response 402.

Also in the ERASE command 1001, a contents generation count field (operand[7] to operand [8]) contains the contents generation count-managed by the contents management unit 222 (or 225). This contents generation count is obtained in the current contents generation count field of the aforementioned QUERY FILE LIST response 402.

Also in the ERASE command 1001, a file ID field (operand [9] and thereafter) contains a file ID, which is information for specifying the file to be deleted (more specifically, the name of the file to be deleted and a path for specifying the position thereof).

In the ERASE response 1002, an opcode field contains a value same as that of the opcode field of the ERASE command 1001. An operand field contains various parameter information corresponding to the ERASE command 1001. In the ERASE response 402, a symbol ".rarw." indicates that there is stored a value that is the same as that of the ERASE command 1001.

Also in the ERASE response 1002, an operand [0] field contains a result code, indicating the result of execution for the received ERASE command 1001.

Also in the ERASE response 1002, a current media generation count field (operand [5] to operand [6]) contains the latest media generation count managed by the media management unit 202 (or 207) of the controlled device. In this current media generation count field, there is set the media generation count updated according to the result of execution of the ERASE command 1001.

Also in the ERASE response 1002, a current contents generation count field (operand [7] to operand [8]) contains the latest contents generation count managed by the contents management unit 203 (or 208) of the controlled device. In this current contents generation count field, there is set the contents generation count updated according to the result of execution of the ERASE command 1001.

In the following there will be explained a WRITE command and a WRITE response with reference to FIG. 11.

Referring to FIG. 11, a "command format" 1101 indicates the data format of a "WRITE command" which is one of the commands transmitted from the controlling device to the controlled device, and a "response format" 1102 indicates the data format of a "WRITE response" corresponding to the aforementioned WRITE command. The WRITE command is used for writing a new file recorded in one of the removable storage media connected to the controlled device.

In the WRITE command 101, an opcode field contains an opcode indicating a WRITE command. Also an operand field contains various parameter information required for the WRITE command.

Also in the WRITE command 101, a destination field (operand [3] to operand [4]) contains a destination plug, which is information for designating one of logical input/output plugs (also called terminals) set between the controlled device and the controlling device. The controlled device receives the file transmitted from the controlling device through the logical input/output plug, and stores it in the storage medium designated by the WRITE command. The input/output plugs are managed by the 1394 interface 110.

Also in the WRITE command 101, a file size field (operand [5] to operand [8]) contains a file size, which is information for designating the data size of the file to be newly recorded. The controlled device discriminates, based on the file size information, whether the file requested by the WRITE command can be stored or not.

Also in the WRITE command 101, a media generation count field (operand [9] to operand [10]) contains the aforementioned media generation count. Also a contents generation count field (operand [11] to operand [12]) contained the aforementioned contents generation count the controlled device compares the media generation count with that managed by the controlling device, and executes or not additional recording of the file respectively if they mutually coincide or not.

Also in the WRITE command 101, a physical volume number field (operand [13]) contains the aforementioned physical volume number. Also a logical volume number field (operand [14]) stores the aforementioned logical volume number. The controlling device designates, as the object of access, a specified storage medium among the physically or logically different plural storage media, based on theses two fields.

Also in the WRITE command 1101, a file ID field (operand [15] and thereafter) contains the aforementioned file ID. Based on the file ID, the controlled device recognizes the file name of the file to be newly added and the directory in which the file is to be stored.

In the WRITE response 1102, an opcode field contains a value same as that in the opcode field of the WRITE command 1101. Also an operand field of the WRITE response 1102 contains various parameter information corresponding to the WRITE command 1101. In the WRITE response 1102, a symbol ".rarw." indicates that there is stored a value same as that of the WRITE command 1101.

Also in the WRITE response 1102, an operand [0] field contains a result code, indicating the result of execution for the received WRITE command 1101.

Also in the WRITE response 1102, a current media generation count field (operand [9] to operand [10] contains the latest media generation count managed by the media management unit 202 (or 207) of the controlled device. In this current media generation count field, there is set the media generation count updated according to the result of execution of the WRITE command 1101.

Also in the WRITE response 1102, a current contents generation count field (operand [11] to operand [12]) contains the latest contents generation count managed by the contents management unit 203 (or 208) of the controlled device. In this current contents generation count field, there is set the contents generation count updated according to the result of execution of the WRITE command 1101.

Also in the WRITE response 1102, a new file ID field (operand [15] and thereafter contains a new file ID, which is information for specifying a file newly stored based on the WRITE command 1101 (more specifically the name of the newly stored file and the path for specifying the position of the file). The new file ID may be different from the file ID of the WRITE command 1101 as will be explained later.

In the following there will be explained, with reference to FIG. 5, the data format of the directory entry information of the present embodiment.

The directory entry information of the present embodiment is composed of a data block of 32 bytes, and contains information relating to the file or to the directory. The directory entry information is managed by a file management unit 204 or 209 of the controlled device.

Referring to FIG. 5, a file name (base) field 501 stores information (8 characters) indicating the name of a file or a directory. A file name (extension) field 502 stores information indicating the extender (3 characters) of the file. An attribute byte field 503 stores attribute information (for example "file" or "directory") of the file or the directory. There is also provided a reserved field 504. A modification time field 505 stores information indicating the time of preparation of modification of the file or the directory. A modification date field 506 stores information indicating the date of preparation or modification of the file or the directory. A starting allocation unit field 507 stores information indicating where the file or the directory is stored in the storage medium. A file size field 508 stores information indicating the data amount of the file.

In the following there will be explained, with reference to FIG. 6, the content of the attribute information set in the attribute byte field 503.

Figures 6, 7, 8:
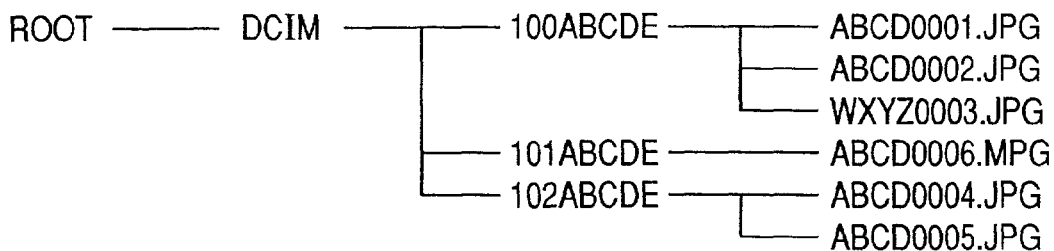
FIG. 6 is a view showing the content of attribute information of a file.
FIG. 7 is a view showing an example of the file system of a storage medium connected to the controlled device.
FIG. 8 is a view showing an example of data stored in the QUERY FILE LIST command.

Referring to FIG. 6, the 0-th bit (1 sb), if set, indicates a "read-only file". The 1st bit in the set state indicates a "hidden file", and the second bit in the set state indicates a "system". Also, the third bit in the set state indicates a "volume", the fourth bit in the set state indicates a "directory", the fifth bit in the set state indicates a "archive", and the sixth and seventh bits are reserved.

Now there will be explained, with reference to FIG. 7, an example of the directory structure of storage medium A connected to the digital camera 101 and an example of the data file stored in that storage medium.

In the example shown in FIG. 7, a subdirectory DCIM is present in a layer under the root directory ROOT, and three subdirectories 100ABCDE, 101ABCDE and 102ABCDE are further present in a layer under the subdirectory DCIM.

In subdirectories 100ABCDE and 102ABCDE, there exist image files based on the JPEG format (hereinafter called JPEG files). More specifically, subdirectory 100ABCDE contains three JPEG files (ABCD0001.JPG, ABC0002.JPG, WXYZ0003.JPG) while subdirectory 102ABCDE contains two JPEG files (ABCD0004.JPG, ABCD0005.JPG). Also, subdirectory 101ABCDE contains an image file based on the MPEG format (ABCD0005.MPG).

In the following there will be explained the procedure of acquiring the file list of files of a predetermined format, stored in storage medium A. In the present embodiment, there will be explained the procedure in case the controlling device DTV 105 requests the directory entry information on all the directories contained in the directory DCIM and those 100ABCDE, 101ABCDE and 102ABCDE present in the immediately lower layer, and the directory entry information on all the JPEG files.

The media management unit 111 of the DTV 105, functioning as the controlling device, generates a QUERY FILE LIST command 401 and sends it to the 1394 interface 110. The 1394 interface 110 of the DTV 105 transfer the QUERY FILE LIST command 401 to the digital camera 101 serving as the controlled device, by asynchronous transfer.

There will be explained, with reference to FIG. 8, an example of information set in the QUERY FILE LIST command 401. The extension field of the QUERY FILE LIST command 401 stores "4A 50 47.sub.16(JPG)" 801. "4A 50 47.sub.16" designates the extender (JPG) of the JPEG file. The depth field stores "01.sub.16" 802, which designates directories from the one designated by the start path field to those in an immediately lower layer. The start path field stores "SC 44 43 49 4D.sub.16 (.Yen.DCIM)" 803, which designates the subdirectory DCIM present in a layer immediately under the room directory. Also, in the QUERY FILE LIST command 401, the physical volume number field and the logical volume number field store a physical volume number and a logical volume number designating storage medium A.

After receiving the QUERY FILE LIST command 401, the control unit 211 of the digital camera 101 discriminates whether the command 401 can be accepted. If not acceptable, the control unit 211 returns a QUERY FILE LIST response 402 containing a result code indicting "not acceptable".

On the other hand, if the QUERY FILE LIST command 401 can be accepted, the control unit 211 sets a result code indicating "acceptance" in the result field, sets the current media generation count value held by the media management unit 202 (namely current media generation count of the storage medium A, "0" in the present case) in the current media generation count field, and further sets the current contents generation count value held by the contents management unit 203 (namely the current contents generation count of the storage medium A, "0" in the present case) in the current contents generation count field and returns such QUERY FILE LIST response 402. Based on such response 402, the DTV 105 acquires the media management information and the contents management information required for remote controlling storage medium A and holds such information in the media management unit 221 and in contents management unit 222.

After returning the response 402, the digital camera 101 reads the file list requested by the QUERY FILE LIST command from the file system management unit 204 and executes asynchronous transfer of such file list in succession.

Now there will be explained, with reference to FIG. 9, an example of the file list transferred from the digital camera 101 to the DTV 105.

At first the digital camera 101 executes asynchronous transfer, to the DTV 105, of the directory entry information 901 of the directory (subdirectory DCIM shown in FIG. 7 in this case) set in the start path field of the QUERY FILE LIST command 401. In the directory entry information 901, the file name (base) field 501 stores information indicating DCIM, and the attribute byte field 503 stores information indicating "directory".

Then the digital camera 101 executes asynchronous transfer, to the DTV 105, of the directory entry information 902 of the subdirectory (subdirectory 100ABCDE shown in FIG. 7 in this case) in the layer under the subdirectory DCIM. In the directory entry information 902, the file name (base) field 501 stores information indicating "100ABCDE", and the attribute byte field 503 stores information indicating "directory".

Then the digital camera 101 executes asynchronous transfer, to the DTV 105, in succession of the directory entry information 903 to 905 of the JPEG files (in this case, the JPEG files "ABCD0001.JPG", "ABCD0002.JPG" and "WXYZ0003.JPG" shown in FIG. 7) held by the subdirectory "100ABCDE". The file name (base) fields 501 of the directory entry information 903 to 905 store information indicating "ABCD0001", "ABCD0002" and "WXYZ0003", while the file name (extension) field 502 stores information indicating "JPG", and the attribute byte field 503 stores information indicating "file".

After transferring the directory entry information 903 to 905 of all the JPEG files, the digital camera 101 executes asynchronous transfer, to the DTV 105, of the directory entry information 906 of an end directory " . . . " corresponding to the subdirectory "100ABCDE". In the directory entry information 906, the file name (base) field 501 stores information indicating " . . . ", and the attribute byte field 503 stores information indicating "directory".

Then the digital camera 101 executes asynchronous transfer, to the DTV 105 in succession, of the directory entry information 907 of the subdirectory "100ABCDE" and the directory entry information 908 of the end directory " . . . " corresponding to the subdirectory "100ABCDE".

Then the digital camera 101 executes asynchronous transfer, to the DTV 105 in succession, of the directory entry information 907 of the subdirectory "102ABCDE", the directory entry information 910 of the JPEG file "ABCD0004.JPG" held by the subdirectory "102ABCDE", the directory entry information 911 of the JPEG file "ABCD0005.JPG" held by the subdirectory "102ABCDE", and the directory entry information 912 of the end directory corresponding to the subdirectory "102ABCDE".

Finally, the digital camera 101 executes asynchronous transfer, to the DTV 105, of the directory entry information 913 of the end directory " . . . " corresponding to the directory DCIM, thereby completing the transfer of the file list.

The media management unit 110 of the DTV 105 stores the received file list in a file system management unit 223. A control unit 227 reads the file list from the file system management unit 223 whenever necessary, and graphically displays the directory structure of storage medium A and the JPEG files contained in each directory utilizing icons or the like on a display unit 228. The user can made access to each of the JPEG files stored in storage medium A based on the file list displayed on the display unit 228, and can execute deletion of an arbitrary file and addition of a file to an arbitrary directory.

Through the above-described procedure, the DTV 105 serving as the controlling device is rendered capable, by only using a command, not only of recognizing the directory structure from the directory "DCIM" to the subdirectories "100ABCDE", "101ABCDE" and "102ABCDE" in storage medium A but also of confirming all the JPEG files held in each directory.

In the following there will be explained, by various examples, a procedure in which the DTV 105 (controlling device) deletes the JPEG file "ABCD0002.JPG" in storage medium A connected to the digital camera 101 (controlled device) by means of the ERASE command shown in FIG. 10.

At first there will be explained the procedure in a case where there has not been executed the deletion of a file from storage medium A nor the addition of a file thereto nor the replacement of storage medium A by another storage medium, in the period from the acquisition of the file list of storage medium A to the transmission of the ERASE command.

The control unit 227 of the DTV 105 generates an ERASE command 1001. In the ERASE command 1001, the media generation count field sets the media generation count ("0" in this case) of the storage medium A managed by the media management unit 221. The contents generation count field sets the contents generation count ("0" in this case) of storage medium A managed by the contents management unit 222. The file ID field sets the file ID ".Yen.DCIM.Yen.100ABCDE.Yen.ABCD0002.JPG", and the physical volume number field and the logical volume number field set a physical volume number and a logical volume number designating storage medium A. The 1394 interface 110 of the DTV 105 executes asynchronous transfer of such ERASE command 1001 to the digital camera 101.

The control unit 211 of the digital camera 101 detects the media generation count from the ERASE command 1001, and compares it with the media generation count managed by the media management unit 202. As the media generation count of the DTV 105 coincides with that of the digital camera 101 in this case, the control unit 211 executes control according to the ERASE command 1001.

Then the control unit 211 of the digital camera 101 detects the file ID (".Yen.DCIM.Yen.100ABCDE.Yen.ABCD0002.JPG" in this case) from the ERASE command 1001 and deletes the file designated by the file ID (the JPEG file "ABCD0002.JPG" in the subdirectory "100ABCDE" in this case). After the deletion of the file "ABCD0002.JPG", the file system management unit 204 updates the file list of storage medium A to a new file list. Also, the contents management unit 203 updates the content of the contents generation count corresponding to storage medium A (updating from "0" to "1" in this case).

Then the control unit 211 of the digital camera 101 generates an ERASE response 1002 corresponding to the ERASE command 1001. In this ERASE response 1002, the result field sets a result code indicating that "deletion of the designated file has been completed normally". Also, the current media generation count field sets the media generation count ("0" in this case) managed by the media management unit 202, and the current contents generation count field sets the contents generation count ("1" in this case) managed by the contents management unit 203. The 1394 interface 110 of the digital camera 101 executes asynchronous transfer of the ERASE response 1002 to the DTV 105.

The control unit 227 of the DTV 105 checks the result field of the ERASE response 1002, thereby detecting whether the deletion of the file "ABCD0002.JPG" has been successfully completed. As the file "ABCD0002.JPG" has been normally deleted in this case, the display unit 228 visually displays a message or an animation indicating that the deletion of the file "ABCD0002.JPG" has been normally completed.

Also the control unit 227 of the DTV 105 detects the contents generation count from the ERASE response 1002 and compares it with the contents generation count managed by the contents management unit 222. The control unit 227 detects that the contents generation count has been increased by one (contents generation count of the digital camera 101–contents generation count of the DTV=1), thereby recognizing that "no access has been made to change the content of the storage medium A, except for the deletion of the file ABCD0002.JPG".

The file system management unit 223 of the DTV 105 updates the file list of storage medium A. Also the contents management unit 222 stores the contents generation count, detected from the ERASE response 1002, in the contents generation count register, thereby updating the contents generation count managed by the DTV 105. The updated contents generation count is set in a next command for storage medium A.

Through the above-described procedure, the digital camera 101, constituting the controlled device, can securely delete, using the ERASE command 1001 containing the media management information and the contents management information, only the file designated by the ERASE command 1001 from the storage medium designated by the ERASE command 1001. Also, the DTV 105, constituting the controlling device, can easily recognize that only the file designated by the ERASE command 1001 has been deleted, utilizing the ERASE response 1002 containing the media management information and the contents management information.

In the following there will be explained the procedure in case a file other than the JPEG file "ABCD0002.JPG" is deleted from or added to storage medium A, in the period from the acquisition of the file list of storage medium A to the transmission of the ERASE command.

In case the content of storage medium A is changed by the operation of the digital camera 101 or another device (in this case, deletion or addition of a file other than the JPEG file "ABCD0002.JPG"), the file system management unit 204 updates the file list of storage medium A to a new file list, and the contents management unit 203 updates the content of the contents generation count (from "0" to "1" in this case).

The media management unit 111 of the DTV 105 generates the aforementioned ERASE command 1001, and the 1394 interface 110 executes asynchronous transfer of this ERASE command 1001 to the digital camera 101.

The control unit 211 of the digital camera 101 detects the media generation count from the ERASE command 1001 and compares it with the media generation count managed by the media management unit 202. Since the media generation count of the DTV 105 coincides with that of the digital camera 101 in this case, the control unit 211 executes control according to the ERASE command 1001.

Then the control unit 211 of the digital camera 101 detects the file ID from the ERASE command 1001 and deletes the file designated by the file ID (in this case, the JPEG file "ABCD0002.JPG" in the subdirectory "100ABCDE"). After the deletion of the designated file, the file system management unit 204 updates the file list of storage medium A to a new file list, and the contents management unit 203 updates the content of the contents generation count corresponding to storage medium A (from "1" to "0" in this case).

Then the control unit 211 of the digital camera 101 generates an ERASE response 1002 corresponding to the ERASE command 1001. In this ERASE response 1002, the result field sets a result code indicating that "deletion of the designated file has been completed normally". Also, the current media generation count field sets the media generation count ("0" in this case) managed by the media management unit 202, and the current contents generation count field sets the contents generation count ("2" in this case) managed by the contents management unit 203. The 1394 interface 110 of the digital camera 101 executes asynchronous transfer of the ERASE response 1002 to the DTV 105.

The control unit 227 of the DTV 105 checks the result field of the ERASE response 1002, thereby detecting whether the deletion of the file "ABCD0002.JPG" has been successfully completed. As the file "ABCD0002.JPG" has been normally deleted in this case, the display unit 228 visually displays a message or an animation indicating that the deletion of the file "ABCD0002.JPG" has been normally completed.

Also the control unit 227 of the DTV 105 detects the contents generation count from the ERASE response 1002 and compares it with the contents generation count managed by the contents management unit 222. In this case, the control unit 227 detects that the contents generation count has been increased by two (contents generation count of the digital camera 101–contents generation count of the DTV=2), thereby recognizing that "one" access has been made to change the content of storage medium A, in addition to the deletion of the file "ABCD0002.JPG". Thus, it is automatically recognized that the updating to a new file list is necessary. Then the display unit 228 visually displays a message or an animation indicating that "Updating of the file list of storage medium A is necessary. Update now?".

In case of updating the content of the file list according to the instruction of the user, the media management unit 111 of the DTV 105 transmits the aforementioned QUERY FILE LIST command 401 again, thereby acquiring the new file list, new media generation count and new contents generation count of storage medium A. The newly acquired media generation count is stored in the media generation count register of the media management unit 211, and the newly acquired contents generation count is stored in the contents generation count register of the contents management unit 222.

Through the above-described procedure, the digital camera 101, constituting the controlled device, can securely delete, using the ERASE command 1001 containing the media management information and the contents management information, only the file designated by the ERASE command 1001 from the storage medium designated by the ERASE command 1001. Also the DTV 105, constituting the controlling device, can easily recognize that the content of storage medium A has been changed by another device, utilizing the ERASE response 1002 containing the media management information and the contents management information.

In the following there will be explained the procedure in case the JPEG file "ABCD0002.JPG" is deleted from storage medium A, in the period from the acquisition of the file list of storage medium A by the DTV 105 to the transmission of the ERASE command.

In a case where the content of storage medium A is changed by the operation of the digital camera 101 or another device (in this case, deletion of the JPEG file "ABCD0002.JPG"), the file system management unit 204 updates the file list of storage medium A to a new file list, and the contents management unit 203 updates the content of the contents generation count (from "0" to "1" in this case).

The media management unit 111 of the DTV 105 generates the aforementioned ERASE command 1001, and the 1394 interface 110 executes asynchronous transfer of this ERASE command 1001 to the digital camera 101.

The control unit 211 of the digital camera 101 detects the media generation count from the ERASE command 1001 and compares it with the media generation count managed by the media management unit 202. Since the media generation count of the DTV 105 coincides with that of the digital camera 101 in this case, the control unit 211 executes control according to the ERASE command 1001.

Then the control unit 211 of the digital camera 101 detects the file ID from the ERASE command 1001 and deletes the file designated by the file ID (in this case, the JPEG file "ABCD0002.JPG" in the subdirectory "100ABCDE"). However, since the JPEG file "ABCD0002.JPG" has already been deleted, the contents management unit 203 does not change the content of the contents generation count (which remains as "1" in this case).

Then the control unit 211 of the digital camera 101 generates an ERASE response 1002 corresponding to the ERASE command 1001. In this ERASE response 1002, the result field sets a result code indicating that "the designated file does not exist". Also, the current media generation count field sets the media generation count ("0" in this case) managed by the media management unit 202, and the current contents generation count field sets the contents generation count ("1" in this case) managed by the contents management unit 203. The 1394 interface 110 of the digital camera 101 executes asynchronous transfer of the ERASE response 1002 to the DTV 105.

The control unit 227 of the DTV 105 checks the result field of the ERASE response 1002, thereby detecting whether the deletion of the file "ABCD0002.JPG" has been successfully completed. As the file "ABCD0002.JPG" does not exist in this case, the display unit 228 visually displays a message or an animation indicating that the file "ABCD0002.JPG" does not exist.

Also the control unit 227 of the DTV 105 detects the contents generation count from the ERASE response 1002 and compares it with the contents generation count managed by the contents management unit 222. In this case, the control unit 227 detects that the contents generation count has been increased by one (contents generation count of the digital camera 101–contents generation count of the DTV=1), thereby recognizing that "one" access has been made to change the content of storage medium A. Thus, it is automatically recognized that the updating to a new file list is necessary. Then, the display unit 228 visually displays a message or an animation indicating that "Updating of the file list of storage medium A is necessary. Update now?".

In case of updating the content of the file list according to the instruction of the user, the media management unit 111 of the DTV 105 transmits the aforementioned QUERY FILE LIST command 401 again, thereby acquiring the new file list, new media generation count and new contents generation count of storage medium A. The newly acquired media generation count is stored in the media generation count register of the media management unit 211, and the newly acquired contents generation count is stored in the contents generation count register of the contents management unit 222.

Through the above-described procedure, the digital camera 101, constituting the controlled device, can securely delete, using the ERASE command 1001 containing the media management information and the contents management information, only the file designated by the ERASE command 1001 from the storage medium designated by the ERASE command 1001. Also, the DTV 105, constituting the controlling device, can easily recognize that the file designated by the ERASE command 1001 has already been deleted, utilizing the ERASE response 1002 containing the media management information and the contents management information.

In the following there will be explained the procedure in case storage medium A is taken out from the main body of the digital camera 101, in the period from the acquisition of the file list of storage medium A by the DTV 105 to the transmission of the ERASE command.

In a case where storage medium A is taken out from the main body of the digital camera 101, the file system management unit 204 erases the file list of storage medium A, and the contents management unit 203 updates the content of the contents generation count (from "0" to "1" in this case).

The media management unit 111 of the DTV 105 generates the aforementioned ERASE command 1001, and the 1394 interface 110 executes asynchronous transfer of this ERASE command 1001 to the digital camera 101.

The control unit 211 of the digital camera 101 detects the media generation count from the ERASE command 1001 and compares it with the media generation count managed by the media management unit 202. Since the media generation count of the DTV 105 coincides with that of the digital camera 101 in this case, the control unit 211 executes control according to the ERASE command 1001.

Then the control unit 211 of the digital camera 101 detects the file ID from the ERASE command 1001 and deletes the file designated by the file ID (in this case, the JPEG file "ABCD0002.JPG" in the subdirectory "100ABCDE"). However, since storage medium A does not exist in this case, the contents management unit 203 does not change the content of the contents generation count (remaining as "1" in this case).

Then the control unit 211 of the digital camera 101 generates an ERASE response 1002 corresponding to the ERASE command 1001. In this ERASE response 1002, the result field sets a result code indicating that "the storage medium does not exist". Also, the current media generation count field sets the media generation count ("0" in this case), and the current contents generation count field sets the contents generation count ("1" in this case). The 1394 interface 110 of the digital camera 101 executes asynchronous transfer of the ERASE response 1002 to the DTV 105.

The control unit 227 of the DTV 105 checks the result field of the ERASE response 1002, thereby detecting whether the deletion of the file "ABCD0002.JPG" has been successfully completed. As storage medium A does not exist in this case, the display unit 228 visually displays a message or an animation indicating that storage medium A does not exist.

Also the control unit 227 of the DTV 105 clears the contents generation count of storage medium A managed by the media management unit 221 and the contents generation count of storage medium A managed by the contents management unit 222. It also clears the content of the file system management unit 223 which manages the file list.

Through the above-described procedure, the digital camera 101, constituting the controlled device, can easily recognize, using the ERASE command 1001 containing the media management information and the contents management information, the storage medium designated by the ERASE command 1001 is not connected, thereby preventing an erroneous operation. Also, the DTV 105, constituting the controlling device, can easily recognize that the storage medium designated by the ERASE command 1001 is not connected, utilizing the ERASE response 1002 containing the media management information and the contents management information.

In the following there will be explained the procedure in a case where storage medium A is replaced by another storage medium, in the period from the acquisition of the file list of storage medium A by the DTV 105 to the transmission of the ERASE command.

In a case where storage medium A is taken out from the digital camera 101 and replaced by another storage medium, the file system management unit 204 holds the file list of such other storage medium, and the media management unit 202 updates the content of the media generation count (from "0" to "1" in this case), and the contents management unit 203 updates the content of the contents generation count (from "0" to "2" in this case).

The media management unit 111 of the DTV 105 generates the aforementioned ERASE command 1001, and the 1394 interface 110 executes asynchronous transfer of this ERASE command 1001 to the digital camera 101.

The control unit 211 of the digital camera 101 detects the media generation count from the ERASE command 1001 and compares it with the media generation count managed by the media management unit 202. Since the media generation count of the DTV 105 does not coincide with that of the digital camera 101 in this case, the control unit 211 rejects the ERASE command 1001 and does not execute the deletion of the file designated by the ERASE command 1001. Such configuration allows the digital camera 101, constituting the controlled device, to inhibit access to the storage medium other than that designated by the ERASE command 1001, thereby securely preventing drawback that the same file present in another storage medium is erroneously deleted.

Then the control unit 211 of the digital camera 101 generates an ERASE response 1002 corresponding to the ERASE command 1001. In this ERASE response 1002, the result field sets a result code indicating that "another storage medium is connected". Also, the current media generation count field sets the media generation count ("1" in this case), and the current contents generation count field sets the contents generation count ("2" in this case). The 1394 interface 110 of the digital camera 101 executes asynchronous transfer of the ERASE response 1002 to the DTV 105.

The control unit 227 of the DTV 105 checks the result field of the ERASE response 1002, thereby detecting whether the deletion of the file "ABCD0002.JPG" has been successfully completed. As case storage medium A is replaced by another storage medium in this case, the display unit 228 visually displays a message or an animation indicating that another storage medium is connected.

Also, the control unit 227 of the DTV 105 clears the contents generation count of storage medium A managed by the media management unit 221 and the contents generation count of storage medium A managed by the contents management unit 222. It also clears the content of the file system management unit 223 which manages the file list.

Through the above-described procedure, the digital camera 101, constituting the controlled device, can easily recognize, using the ERASE command 1001 containing the media management information and the contents management information, the storage medium designated by the ERASE command 1001 is replaced, thereby preventing an erroneous operation. Also, the DTV 105, constituting the controlling device, can easily recognize that the storage medium designated by the ERASE command 1001 is replaced by another storage medium, utilizing the ERASE response 1002 containing the media management information and the contents management information.

In the present embodiment, there has been explained a configuration in which the DTV 105 constitutes the controlling device, and the ERASE command 1001 and the ERASE response 1002 are used for deleting a file stored in storage medium A, but the present invention is not limited to such configuration. Any of the digital camera 101, the DVR 102, the camera-integrated DVR 103, the printer 104 and the PC 106 can become the controlling device, like the DTV 105 explained in the foregoing.

Also in the present embodiment, there has been explained a configuration in which the digital camera 101 constitutes the controlled device, and the ERASE command 1001 and the ERASE response 1002 are used for deleting a file stored in storage medium A, but the present invention is not limited to such configuration. Any of the DVR 102, the camera-integrated DVR 103, the printer 104, the DTV 105 and the PC 106 can become the controlled device, like the digital camera 101 explained in the foregoing.

Also in the present embodiment, there has been explained a configuration in which the ERASE command 1001 and the ERASE response 1002 are used for deleting a file stored in storage medium A, but the present invention is not limited to such configuration. Any of the files stored in other storage media B to J can be deleted, like the case of storage medium A, by means of the ERASE command 1001 and the ERASE response 1002.

In the following there will be explained a procedure in which the DTV 105 (controlling device) adds a JPEG file "ABCD0006.JPG" in the directory "101ABCDE" of storage medium A connected to the digital camera 101 (controlled device) by means of the WRITE command shown in FIG. 111.

In the present embodiment there will be explained the procedure in a case where there has not been executed the deletion of a file from storage medium A nor the addition of a file thereto nor the replacement of storage medium A by another storage medium, in the period from the acquisition of the file list of storage medium A by the DTV 105 to the transmission of the WRITE command.

The control unit 227 of the DTV 105 generates a WRITE command 1101. In the WRITE command 1101, the media generation count field sets the media generation count ("0" in this case) of storage medium A read from the media management unit 221. The contents generation count field sets the contents generation count ("0" in this case) of storage medium A read from the contents management unit 222. The file ID field sets the file ID ".Yen.DCIM.Yen.101ABCDE.Yen.ABC0006.JPG" designated by the control unit 211, the file size field sets the data size of the file "ABCD0006.JPG", the designation plug field sets the designation plug, and the physical volume number field and the logical volume number field set a physical volume number and a logical volume number designating storage medium A. The 1394 interface 110 of the DTV 105 executes asynchronous transfer of such WRITE command 1101 to the digital camera 101.

The control unit 211 of the digital camera 101 detects the media generation count from the WRITE command 1101, and compares it with the media generation count managed by the media management unit 202. If the media generation count of the DTV 105 does not coincide with that of the digital camera 101, the control unit 211 judges that the storage medium constituting the object of the WRITE command 1101 does not exist and rejects the command 1101. However, in this case, as the media generation count of the DTV 105 coincides with that of the digital camera 101, the control unit 211 executes control according to the command 1001.

Then the control unit 211 of the digital camera 101 detects the file ID (".Yen.DCIM.Yen.101ABCDE.Yen.ABCD0006.JPG" in this case) from the WRITE command 1101 and additionally stores the file "ABCD0006.JPG" in the directory "100ABCDE" designated by the file ID. After the additional storage of the file "ABCD0006.JPG", the file system management unit 204 updates the file list of storage medium A to a new file list. Also, the contents management unit 203 updates the content of the contents generation count corresponding to storage medium A (updating from "0" to "1" in this case). The media control unit 111 of the digital camera 101 manages, by such updating of the content of the contents generation count, that there has been an access for changing the content of storage medium A.

After the addition of the file "ABCD0006.JPG" to storage medium A, the control unit 211 of the digital camera 101 generates a WRITE response 1102 corresponding to the WRITE command 1101. In this case, in the WRITE response 1102, the result field sets a result code indicating that "addition of the designated file has been completed normally". Also, the current media generation count field sets the media generation count ("0" in this case) managed by the media management unit 202, and the current contents generation count field sets the contents generation count ("1" in this case) managed by the contents management unit 203.

Also the new file ID field of the WRITE response 1102 sets a file ID. Such file ID is usually same as the file ID detected from the WRITE command 1101 but may be different in certain cases. For example, in a case where the file ID detected from the WRITE command 1101 does not designate a directory, the additional file is stored in a directory prepared in advance by the digital camera 101, and the file ID including such directory is set in the new file ID field. The 1394 interface 110 of the digital camera 101 executes asynchronous transfer of the WRITE response 1102 to the DTV 105.

The control unit 227 of the DTV 105 checks the result field of the WRITE response 1102, thereby detecting whether the addition of the file "ABCD0006.JPG" has been normally completed. As the file "ABCD0006.JPG" has been normally added in this case, the display unit 228 visually displays a message or an animation indicating that the deletion of the file "ABCD0006.JPG" has been normally completed.

The control unit 227 of the DTV 105 also detects the contents generation count from the WRITE response 1102 and compares it with the contents generation count managed by the contents management unit 222. The control unit 227 detects that the contents generation count has been increased by one (contents generation count of the digital camera 101−contents generation count of the DTV=1), thereby recognizing that "no access has been made to change the content of storage medium A, except for the addition of the file ABCD0006.JPG".

The file system management unit 223 of the DTV 105 updates the file list of storage medium A. Also the contents management unit 222 stores the contents generation count, detected from the WRITE response 1102, in the contents generation count register, thereby updating the contents generation count managed by the DTV 105. The updated contents generation count is set in a next command for storage medium A.

Through the above-described procedure, the digital camera 101, constituting the controlled device, can securely add, using the WRITE command 1101 containing the media management information and the contents management information, the file designated by the WRITE command 1101 in the storage medium designated by the WRITE command 1101. Also the DTV 105, constituting the controlling device, can easily recognize that the file designated by the WRITE command 1101 has been added, utilizing the WRITE response 1102 containing the media management information and the contents management information.

In the present embodiment, there has been explained a configuration in which the digital camera 101 constitutes the controlled device, and the WRITE command 1101 and the WRITE response 1102 are used for adding a file stored to storage medium A, but the present invention is not limited to such configuration. Any of the DVR 102, the camera-integrated DVR 103, the printer 104, the DTV 105 and the PC 106 can become the controlled device, like the digital camera 101 explained in the foregoing.

Also in the present embodiment, there has been explained a configuration in which the WRITE command 1101 and the WRITE response 1102 are used for adding a file in the storage medium A, but the present invention is not limited to such configuration. A file addition may be made to any of other storage media B to J, like the case of storage medium A, by means of the WRITE command 1101 and the WRITE response 1102.

Figure 12:
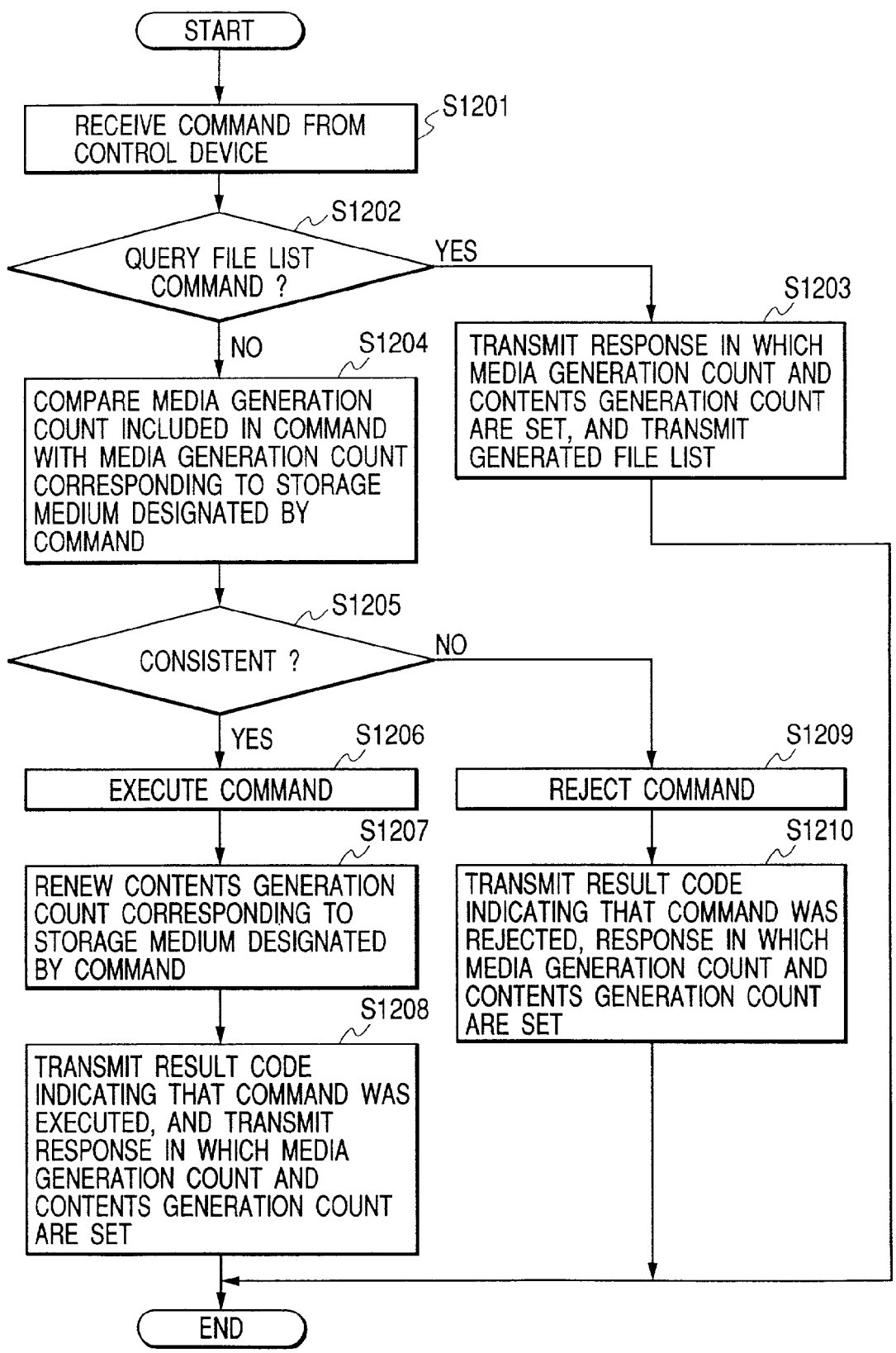
FIG. 12 is a flow chart showing the control sequence of a file management unit provided in the controlled device in an embodiment of the present invention.

In the following there will be explained, with reference to a flow chart shown in FIG. 12, the process sequence of the file management unit 111 provided in the controlled device of the present embodiment.

In step S1201, the controlled device (any of the electronic devices 101 to 106 shown in FIG. 1) receives a command (QUERY FILE LIST command, ERASE command or WRITE command described in the foregoing) transmitted from the controlling device (any of the electronic devices 101 to 106).

In step S1202, the controlled device discriminates whether the received command is a QUERY FILE LIST command, and, if so, the sequence proceeds to a step S1203, but otherwise, the sequence proceeds to step S1204.

In step S1203, the controlled device transmits, to the controlling device, a QUERY FILE LIST response containing the media generation count, contents generation count, etc. corresponding to the storage medium (any of storage media A to J shown in FIG. 1) designated by the QUERY FILE LIST command, and transmits, to the controlling device, a file list of the directory designated by the QUERY FILE LIST command and the directories thereunder. By receiving such QUERY FILE LIST response, the controlling device acquires the file list of the storage medium designated by the QUERY FILE LIST command. There are also acquired the new media generation count and the new contents generation count of the storage medium designated by the QUERY FILE LIST command.

On the other hand, in step S1204, the controlled device compares the media generation count contained in the received command (namely media management information managed by the controlling device) with the media generation count (namely media management information managed by the controlled device) corresponding to the storage medium (any of storage media A to J shown in FIG. 11) designated by the received command.

In step S1205, the controlled device discriminates whether the two media generation counts compared in step S1204 mutually coincide. In a case of coincidence, the sequence proceeds to step S1206, but, in a case of non-coincidence, the sequence proceeds to step S1209.

In step S1206, the controlled device recognized that the storage medium designated by the received command is still connected, and executes the process designated by the received command. In a case where the received command is an ERASE command explained in the foregoing, there is deleted a file designated by the ERASE command, and, in a case where the received command is a WRITE command explained in the foregoing, there is added a file designated by the WRITE command.

In step S1207, the controlled device updates the contents generation count corresponding to the storage medium designated by the received command.

In step S1208, the controlled device transmits, to the controlling device, a response containing a result code indicating that the process designated by the received command has been executed and also containing a media generation count and a contents generation count corresponding to the storage medium designated by the received command. By receiving such response, the controlling device recognizes that the process designated by the command has been executed. Also, the controlling device can automatically recognize, based on the contents generation count contained in the response, whether the updating of the file list is necessary or not.

In step S1209, the controlled device recognizes that the storage medium designated by the received command has been replaced, and rejects the process designated by the received command.

In step S1210, the controlled device transmits, to the controlling device, a response containing a result code indicating that the process designated by the received command has been rejected and also containing a media generation count and a contents generation count corresponding to the storage medium designated by the received command. By receiving such response, the controlling device recognizes that the process designated by the command has been rejected.

Other Embodiments of the Present Invention

The present invention may be applied to a system consisting of plural pieces of equipment (for example host computer, interface devices, reader, printer, etc.) or an apparatus consisting of a single piece of equipment.

Also, the present invention includes a case where the program codes of a software realizing the functions of the aforementioned embodiments are supplied to a computer of a system or an apparatus connected to various devices in order to operate the devices so as to realize the functions of the aforementioned embodiments and the functions of the aforementioned embodiments are realized by operating the devices by the computer (CPU or MPU) of the above-mentioned system or apparatus according to the program codes.

In such case the program codes themselves of the software realize the functions of the aforementioned embodiments, and the program codes themselves and the means for supplying the computer with such program codes, for example a memory medium storing the program codes, constitutes the present invention. The memory medium storing such program codes can be, for example, a floppy disk, a hard disk, an optical disk, a magnetooptical disk, a CD-ROM, a magnetic tape, a non-volatile memory card or a ROM.

The present invention also includes such program codes not only in a case where the functions of the aforementioned embodiments are realized by the execution of the read program codes by the computer but also a case where an operating system or the like functioning on the computer executes all or a part of the actual processes under the control of such program codes thereby realizing the functions of the aforementioned embodiments.

The present invention further includes a case wherein the program codes read from the memory medium are once stored in a memory provided in a function expansion board inserted into the computer or a function expansion unit connected to the computer, and a CPU-provided in the function expansion board or the function expansion unit executes all the process or a part thereof according to the instructions of such program codes, thereby realizing the functions of the aforementioned embodiments.

According to the foregoing embodiments explained in the foregoing, the media management information of the predetermined removable storage medium is managed by both the controlling device and the controlled device, whereby the controlling device can easily recognize the change in the connection of the storage medium and the controlled device can securely prevent the erroneous operations on other storage media than the above-mentioned storage medium.

Also according to the foregoing embodiments explained in the foregoing, the contents management information of the predetermined removable storage medium is managed by both the controlling device and the controlled device, whereby the controlling device can easily recognize the change in the stored content of the storage medium and the controlled device can securely prevent the erroneous operations on other storage media than the above-mentioned storage medium.

The invention may be embodied in other specific forms without departing from essential characteristics thereof.

Therefore, the above-mentioned embodiments are merely examples in all respects, and must not be construed to limit the invention.

The scope of the present invention is defined by the scope of the appended claims, and is not limited at all by the specific description of this specification. Furthermore, all the modifications and changes belonging to equivalents of the claims are considered to fall within the scope of the present invention.

What is claimed is:

1. A device for managing removable storage media, comprising:
   a first management unit adapted to update first media management information which is held in said device and which includes at least a first datum that is used to detect that one removable storage medium has been replaced with a second removable storage medium, when the second removable storage medium is connected to said device, the first datum being information other than a user-input password; and
   a control unit adapted to test a command from an external device for consistency with the first datum and to execute the command if the first datum is consistent with second media management information contained in the command.

2. A device according to claim 1, wherein said device transmits file information of a file stored in the second removable storage medium if the command is executed.

3. A device according to claim 1, wherein said device deletes a file stored in the second removable storage medium if the command is executed.

4. A device according to claim 1, wherein said device adds a new file to the second removable storage medium if the command is executed.

5. A device according to claim 1, further comprising a second management unit adapted to update contents management information when content of the second removable storage medium are changed.

6. A device according to claim 1, wherein said device is one of a digital camera, a camera-integrated digital video recorder, a digital video recorder, a digital television receiver and a printer.

7. A device according to claim 1, wherein said first management unit comprises a counter and the first datum is a count maintained by said counter.

8. A device according to claim 7, wherein said counter is arranged to be re-set when said device is powered on.

9. A method for controlling a device which manages removable storage media, the method comprising the steps of:
   updating first media management information which is held in said device and which includes at least a first datum that is used to detect that one removable storage medium has been replaced with a second removable storage medium, when the second removable storage medium is connected to the device, the first datum being information other than a user-input password;
   testing a command from an external device for consistency with the first datum; and
   executing the command if the first datum is consistent with second media management information contained in the command.

10. A method according to claim 9, further comprising the step of:
    transmitting file information of a file stored in the second removable storage medium if the command is executed.

11. A method according to claim 9, further comprising the step of:
    deleting a file stored in the second removable storage medium if the command is executed.

12. A method according to claim 9, further comprising the step of:
    adding a new file to the second removable storage medium if the command is executed.

13. A method according to claim 9, wherein contents management information is held in the device, and said method further comprising the step of:
    updating the contents management information when contents of the second removable storage medium are changed.

14. A method according to claim 9, wherein the device is one of a digital camera, a camera-integrated digital video recorder, a digital video recorder, a digital television receiver and a printer.

15. A method according to claim 9, wherein the device comprises a counter, and said method further comprises the step of:
    maintaining the first datum as a count maintained by the counter.

16. A method according to claim 15, further comprising the step of:
    re-setting the counter when the device is powered on.

* * * * *

UNITED STATES PATENT AND TRADEMARK OFFICE
CERTIFICATE OF CORRECTION

PATENT NO. : 7,269,691 B2
APPLICATION NO. : 09/725033
DATED : September 11, 2007
INVENTOR(S) : Shinji Onishi It is certified that error appears in the above-identified patent and that said Letters Patent is hereby corrected as shown below:

ON THE TITLE PAGE [56] REFERENCES CITED:

Foreign Patent Documents, "EP 0951018 A1 10/1999" should be deleted;
"JP 03242891 A * 10/1991" should read --JP 3-242891 A * 10/1991--;
"JP 04236623 A *  8/1992" should read --JP 4-236623 A *  8/1992--; and
"JP 08221877 A *  8/1996" should read --JP 8-221877 A *  8/1996--.

COLUMN 6:

Line 13, "prior" (second occurrence) should read --from prior--; and
Line 39, "for" should read --to--.

COLUMN 8:

Line 44, "command 101," should read --command 1101,--;
Line 48, "command 101," should read --command 1101,--;
Line 58, "command 101," should read --command 1101,--; and
Line 64, "command 101," should read --command 1101,--.

COLUMN 9:

Line 1, "count the" should read --count.  The--;
Line 6, "command 101," should read --command 1101;--;
Line 13, "theses." should read --these--; and
Line 44, "(operand [15]" should read --(operand [15])--.

COLUMN 10:

Line 14, "a" should read --an--; and
Line 44, "transfer" should read --transfers--.

UNITED STATES PATENT AND TRADEMARK OFFICE
CERTIFICATE OF CORRECTION

PATENT NO. : 7,269,691 B2
APPLICATION NO. : 09/725033
DATED : September 11, 2007
INVENTOR(S) : Shinji Onishi It is certified that error appears in the above-identified patent and that said Letters Patent is hereby corrected as shown below:

<u>COLUMN 12</u>:

Line 19, "made" should read --make--.

<u>COLUMN 22</u>:

Line 43, "CPU-provided" should read --CPU provided--.

<u>COLUMN 23</u>:

Line 37, "content" should read --contents--.

Signed and Sealed this

Ninth Day of September, 2008

JON W. DUDAS
*Director of the United States Patent and Trademark Office*